United States Patent Office 3,600,338
Patented Aug. 17, 1971

3,600,338
POLYURETHANE RESINS
Hyman M. Molotsky, Chicago, Ill., assignor to
CPC International Inc.
No Drawing. Filed Apr. 2, 1968, Ser. No. 718,195
Int. Cl. C08g 22/14, 22/44
U.S. Cl. 260—2.5AS         21 Claims

ABSTRACT OF THE DISCLOSURE

Polyurethane resins formed by reacting an organic polyisocyanate and an alkoxylated starch hydrolysate prepared by alkoxylating a starch hydrolysate containing at least one reducing saccharide. The resins may be used as coatings or foams, either of the flexible or rigid type, as binders in the foundry process of making cores or molds, or for other uses. Also a method of preparing the above polyurethanes.

---

The reaction of polymeric materials containing free hydroxy groups with organic polyisocyanates is the basis for the industrial production of polyurethane resins including those used as coatings and others utilized in cellular plastic or foam form. Until about the middle of the 1950's the bulk of the commercial products manufactured were made with the hydroxy containing polyester resins and organic polyisocyanates as the main constituents of the polyurethane resins. Those hydroxy containing polyester resins produced from aliphatic type dibasic acids, such as adipic acid, and a glycol were used in the manufacture of flexible products. On the other hand, those polyester resins made from a mixture of dibasic acids, such as adipic and phthalic acids, and a triol, for example, glycerol or trimethylolpropane, were employed for the preparation of rigid polyurethane foams. In the latter products, the triol increased the functionality or cross-linking capacity of the resins to impart thereto greater rigidity, while the cyclic phthalic structure increased the high-temperature resistance of the polymers.

Recently, hydroxy terminated polyether resins have to a great extent replaced the relatively more expensive polyester resins in the manufacture of polyurethane polymers and cellular plastics. Products formed from the polyethers have certain improved desirable properties such as better hydrolytic stability.

However, even resort to use of these hydroxy terminated polyether resins in making polyurethanes has resulted in products deficient in one or more desired properties. For example, many materials of this type have materially less dimensional stability than is desired or even is required in some instances. Dimensional stability particularly suffers under conditions of high relative humidity. Again, polyurethanes of this class or others utilized in coating or foam form possess a number of other drawbacks of varying types and degrees. For example, the utilized polyol reactants in some cases has a limited degree of functionality leading to a final foam product of less than desired strength.

It therefore becomes an object of the invention to provide a new class of polyurethane resins utilizable for a variety of end-uses.

Another object of the invention is to provide polyurethane resins in coating or foam form made by reaction of organic polyisocyanates and a specific class of hydroxy terminated polyethers.

A still further object of the invention is to provide polyurethane foams, either of the flexible or rigid type, which exhibit excellent strength and suitable dimensional stability even under a condition of high relative humidity.

Another object of the invention is to provide a method of making polyurethane foams by reaction of a polyisocyanate and a specifically synthesized polyol.

Yet another object of the invention is to provide a polyurethane resin suitable as a binder for refractory materials such as sand used in the foundry process of making cores and molds.

Other objects will appear hereinafter.

BRIEF SUMMARY

In accordance with the invention a new and improved class of polyurethane resins has been discovered. Broadly speaking, these are made by forming a mixture of an organic polyisocyanate and an alkoxylated starch hydrolysate prepared by alkoxylating a starch hydrolysate containing at least one reducing saccharide component. Greatly preferred are starch hydrolysate syrups containing at least one polysaccharide of the reducing type. The resins while utilizable for a wide variety of end-uses as enumerated below are particularly useful in making rigid or flexible polyurethane foams, or as binders for refractory materials such as sand as used in the foundry process of making cores or molds.

For best results, the resins are formed by making up a reaction mixture which comprises 1–3 parts of said polyisocyanate and 1–3 parts of said alkoxylated starch hydrolysate. Resin may be formed so that they have utility either as coatings or may be reacted in presence of a foaming agent to produce flexible or rigid foams. After the reaction is considered complete, the resins are then cured in the conventional manner.

GENERAL DESCRIPTION

Alkoxylated starch hydrolysate

One of the basic materials used to form the polyurethane resins of the invention is, of course, a polyol source. This material, possessing unique advantage as discussed below, is an alkoxylated starch hydrolysate prepared by alkoxylating a starch hydrolysate containing at least one reducing saccharide.

The basic material utilized in forming the above materials is the starch hydrolysate itself such as a syrup. The syrups generally have a relatively high proportion of low molecular weight polysaccharides, that is those polysaccharides having a degree of polymerization from 2 to 6. Usually the polysaccharide content of the syrup is at least 20% based on total carbohydrated hydrolysates present, and most often ranges from about 60 to about 85%.

The starch hydrolysate syrups themselves are well known materials which need little elaboration. They are generally formed by hydrolyzing starch with acid or enzyme or both.

The starch undergoing conversion may be chosen from a wide variety of sources. Suitable starches include cereal starches such as corn, grain, sorghum and wheat; waxy starches such as waxy milo and waxy maize; and root starches such as potato starch and tapioca starch. Crude starch sources may also be used, such as ground cereals, emacerated tubers or the partially purified starches therefrom.

In addition, high amylose starch, such as, for example, high amylose corn starch, may also be used. A high amylose starch may be prepared in several different ways. For example, it may be recovered from a hybrid corn that is rich in amylose, or it may be prepared by separating any amylose fraction from ordinary starch and blending the fraction with other starchy materials.

One particularly preferred starch conversion syrup is a maltose-containing syrup and most preferably those that are relatively high in maltose content. These are usually made by subjecting starch to action of a malt diastase. In the usual mode of formation, the starch is first acid-thinned, saccharified with a malt enzyme, and then further saccharified with an additional enzyme such as glucamylase. Most preferred syrups of this group have a D.E. ranging from about 35 to about 60 and more often have a D.E. of 40–50. The maltose content, on the other hand, based on solids usually ranges from about 30 to about 80%. Most preferred materials of this type have a maltose content of 40–80%.

The term D.E. (dextrose equivalent) is used herein to refer to the reducing sugars content of the dissolved solids in a starch hydrolysate expressed as dextrose as measured by the Luff-Schoorl Method (NBS Circular C–400, p. 195 as appearing in "Polarimetry, Saccharimetry and the Sugars." Authors: Frederick J. Bates and Assoc.).

Still another preferred syrup is one known in the art as "greens." This is the mother liquor remaining after a first or second crop of dextrose has been crystallized. A typical greens source has a D.E. around 77.

Still other useful materials which may be alkoxylated include dextrose, maltose, isomaltose, maltotriose and other reducing saccharides.

In order to form appropriate alkoxylated hydrolysates useful in the invention, one or a mixture of the above syrups or starch hydrolysates are reacted with an alkylene oxide.

The alkylene oxide addition products are prepared by reacting ethylene oxide, propylene oxide, butylene oxide or mixtures thereof with the starch hydrolysate. This reaction is carried out in a suitably equipped reactor in the presence of a small amount of catalyst by adding the alkylene oxide to the hydrolysate usually with agitation and preferably in a liquid state. If desired, the hydrolysate can be slurried in an inert solvent, such as toluene, xylene, or other suitable hydrocarbon solvents, and then reacted with the alkylene oxide. To prevent formation of undesirable by-products, the reaction is carried out in the absence of water either at atmospheric conditions, or preferably under pressure in a temperature range of 80° C. to 205° C., particularly when more than two mols of alkylene oxide per mol of hydrolysate product is being reacted. Water can be used as a solvent during the initial stages of alkylene oxide addition; i.e., up to the addition of 2 mols of alkylene oxide per mol of hydrolysate. However, as soon as a ratio of preferably 1 to 1.5 mols of alkylene oxide has been reacted, introduction of the alkylene oxide preferably is stopped and the water removed by distillation before resuming alkylene oxide addition. Under these conditions, undesirable by-product formation is negligible.

Any of the typically known catalysts for these reactions can be used for the addition of the alkylene oxide to the solid or liquid starch hydrolysates. Alkaline catalysts are preferred. These are usually the alkali metal catalysts, although tertiary amine type catalysts can also be employed. The quantity of catalyst necessary for suitable reaction is usually in the range of 0.002 to 3.0 percent by weight on total reactants. The catalyst can be added all at once initially, or in increments throughout the course of the reaction.

The alkylene oxide addition products useful in carrying out this invention have an average molecular weight of at least about 250 to a maximum of 5000. The average molecular weight and reactivity of the resulting hydroxyl containing alkylene oxide addition products can be determined by conventional analysis for hydroxyl content. This gives the hydroxyl concentration (hydroxyl number) per unit weight. This method can also be used for determining the hydroxyl concentration (hydroxyl number) of mixtures of the alkylene oxide addition products of the alkyl glycosides with other hydroxyl containing materials. The hydroxyl number is defined in terms of milligrams of potassium hydroxide per gram of hydroxyl containing material. It can be determined analytically by reacting an excess of acetic anhydride in pyridine at reflux with the hydroxyl groups in the resin. The excess unreacted acetic anhydride is then titrated with standard sodium hydroxide solution. The molecular weight is equal to the functionality of the product multiplied by 56,100 divided by the hydroxyl number. The above products have hydroxyl numbers usually ranging from about 70 to about 900.

In order to prepare polyurethane foams which are self-extinguishing and possess a high degree of flame resistance, the above described alkoxylated starch hydrolysates may be further reacted with a phosphorus compound such as a polyphosphoric acid. Generally, sufficient phosphorus is introduced into the polyol product so that the reacted product analyzes 1–10% phosphorus, expressed as P. More often, a useful product analyzes 2–8% phosphorus, expressed as P. Generally, the reaction is followed by neutralization of the phosphated product.

Other typical phosphorus compounds which are chemically adapted to react with the hydroxy groups present in the alkoxylated starch hydrolysates include phosphoric acid, phosphorus acid, metaphosphoric acid, pyrophosphoric acid, hypophosphoric acid, polyphosphoric acid, oxides of phosphorus, such as $P_2O_5$, $P_2O_4$, and $P_2O_3$, and phosphorus oxyhalides such as phosphorus oxychloride, halides of phosphorus such as $PCl_3$, $PCl_5$, $PBr_3$, and $PBr_5$. Greatly preferred are polyphosphoric acids of high $P_2O_5$ content.

Additional polyol

In addition to the use of the just discussed starch hydrolysates as reactants, a blend of the same hydrolysates and an additional polyol may likewise be utilized. Any compound is useful here which contains a plurality of hydroxy groups available for reactivity with polyisocyanate. One or more of these materials may be used in conjunction with one or more of the just discussed alkoxylated starch hydrolysates containing at least one reducing saccharide. Many of these additional polyol compounds used in the overall polyol blend are already known as useful reactants in forming polyurethane resins.

Thus, for example, an additional polyol available for reaction includes one or more hydroxy-containing polyester resins, alkoxylated phosphorus compounds, hydroxy-terminated polyethers, alkoxylated hydroxy amines, and starch polyethers.

Still other polyols which may be used in conjunction with the reducing saccharides described above includes starch, ethylene, propylene, and butylene oxide adducts or mixtures thereof of monoacetone glucose, glycosides such as methyl glucoside, diacetone glucose, cyclodextrin, etc. Still other useful polyols include the same adducts of glycerin and glycols.

When a blend of polyols is utilized as a reactant with the organic polyisocyanate, usually the blend is composed of 10–90% by weight of one or more alkoxylated starch hydrolysates and 10–90% by weight of an additional polyol. More often, the blend is composed of 20–70% by weight of alkoxylated hydrolysate or mixtures thereof, and 30–80% by weight of one or more additional polyols. The percentages are based on total weight of the blend of the polyols.

The polyisocyanates

Suitable polyisocyanates which may be conveniently reacted with the alkoxylated starch hydrolysates or polyol blend including same include a wide variety of organic diisocyanates. The following are typical members of this class; toluene diisocyanate, diphenyl diisocyanate, triphenyl diisocyanate, naphthalene diisocyanate, chlorophenyl-2,4-diisocyanate, ethylene diisocyanate, 1,4-tetramethylene diisocyanate, paraphenylene diisocyanate, hexamethylene diisocyanate, 3,3'-dimenthyl-4,4'-biphenylene diisocyanate, 3,3'-dimethoxy-4,4'-biphenylene diisocyanate, diphenylmethane-4,4'-diisocyanate, etc. Mixtures of two or more of these isocyanates are contemplated.

Polyisocyanates containing more than two isocyanate groups may also be used. Illustrative of these polymethylene polyphenyl isocyanates such as dimethylene triphenyl triisocyanate which is available under the trade name "PAPI." Thus, by the term "polyisocyanate" is meant a molecule containing two or more isocyanate groups.

Foam preparation

The preparation of the urethane foams may be carried out in a variety of techniques. For example, a prepolymer may be prepared by reacting the polyol or blend of polyols and polyisocyanate in the absence of water, and thereafter a foam may be produced by the addition of excess isocyanate, catalyst, and surfactant. Water may also be added to make flexible foams.

In another method known as the one-shot method, the polyol, blowing agent, and isocyanate reactants are simultaneously mixed together and allowed to react in the presence of a catalyst.

In what is known as the semi-prepolymer technique, the polyol is partially extended with excess isocyanate to provide a reaction product containing a high percentage of free isocyanate groups, which is then foamed at a later stage by reaction with additional polyol, blowing agent and catalyst. The polyol derivative containing excess isocyanate may also be moisture cured.

The foaming reaction itself can be carried out by preforming the foam by means of isocyanate and water to form carbon dioxide. Again, foaming can also be effected by means of a blowing agent, such as a low boiling, high molecular weight gas, which vaporizes at or below the temperature of the foaming mass. Preferred blowing agents are the fluorocarbons, such as trichloromonofluoromethane, dichlorodifluoromethane, dichlorofluoromethane, 1,1-dichloro-1-fluoroethane, 1-chloro - 1,1 - difluoro-2,2-dichlorethane, and 1,1,1-trifluoro, 2-chloro-2-fluoro, 3,3-difluoro, 4,4,4-trifluorobutane.

A further method of forming cellular structures in polyurethane resins comprises mechanically whipping an emulsion of the liquid interpolymerizable components under appropriate conditions.

In addition to the main components, namely the alkoxylated starch hydrolysates or polyol blend containing same, and the organic polyisocyanate, the foamable mixture usually contains curing agents. Typical of these are tertiary amines, such as tetramethyl guanidine, tetramethyl-1,3-butanediamine (TMBDA), triethylenediamine (DABCO), dimethylethanolamine, and tin esters such as stannous oleate, stannous octoate, and dibutyl tin dilaurate, etc. The amount of catalyst or curing agent usually varies in a range from about 0.1% to about 5% by weight based upon the reactive components in the foamable mixture.

Other auxiliary agents may also be present which are useful in preparing excellent foams. For example, surfactants may be utilized which are designed to assist in the maintenance of the cell structure of the foam while it is still soft and uncured. The most widely used surfactants here are silicone derivatives.

Also cross-linking agents may be present to provide foams of increased strength. Epoxy resins are exemplary here.

Thus, by varying conditions and/or type of blend of polyols utilized, one can realize foams either of the flexible or rigid type. Both open celled and closed celled rigid and flexible foams may be produced with equal facility.

Generally the open celled foam is made by use of water alone or in combination with fluorocarbons as a foaming agent. The water reacts with the isocyanate groups to produce urea linkages plus carbon dioxide, with the latter causing the open celled effect. Closed cell structures are made by use of hydrocarbons alone, such as by use of fluorocarbons in the absence of water.

Likewise coatings may be made by curing the polyurethane resins of the invention. Again the coatings may be made by the "one-shot" technique or prepolymer method. In still another embodiment involving "moisture-cured" or "two-component" urethane coating applications, a prepolymer is made up in an inert organic solvent. The resultant vehicle either used per se or further mixed with additional polyol component is applied to a substrate, and cures to hard tough films either by reaction of the free isocyanate groups with moisture in the atmosphere, or by reaction of the free isocyanate and hydroxy groups available from excess polyol.

Method of preparing sand cores

The just described resin is also admirably suited as a binder when mixed with a foundry sand. In a greatly preferred embodiment a foundry mix composing a mixture of aggregate material and a binding amount of the here described polymerizable binder also contains a catalyst or acidic accelerator which particularly promotes cure. Cores or molds may then be prepared from the foundry mix. Such a foundry mix may optionally contain other ingredients such as iron oxide, ground flax fibers, wood flour, cereal, pitch and the like. The aggregate, for example, sand is the major constitutent and the binder portion constitutes a relatively minor amount, generally less than 10%, and more frequently within the range of from about 0.25% to about 5%, these percentages being based on the weight of the sand. Most often the binder content will range from about 1% to about 3% by weight based on the weight of the sand.

The binder when mixed with sand and accelerator or catalyst after some lapse of time cures by chemical reaction without a need for external heating means. Cure may be accelerated, of course, by application of heat.

Usually the amount of accelerator is based on the amount of resin binder utilized in the foundry mix. In a preferred embodiment 2–40% by weight of eccelerator or catalyst is employed based on the weight of the resin utilized in the mix. Most preferably 5–30% of catalyst is employed.

In order to form a foundry mix which will be uniformly cured the refractory material, binder and polymerization accelerator should be substantially uniformly mixed. The mixing may take place in any sequence, and may be effected through use of conventional equipment. For example, high-speed foundry mullers may be employed. Likewise, solvents, wetting agents and other expedients may be resorted to in order to carry out uniform blending of the binder, accelerator and refractory material. The binder may be added to the refractory which already contains a catalyst mixed therein. Likewise, the catalyst and refractory may be mixed to which is then added the binder. This latter mode of mixing is preferred.

By way of summary, the foundry cores of the invention are prepared via the following steps:

(1) Form a foundry mix containing aggregate such as sand, binder and polymerization catalyst.

(2) Introduce the foundry mix into a mold or pattern to thereby obtain a green mold.

(3) Allow the green mold to remain in the mold or pattern for a time at least sufficient for the core to obtain a minimum stripping strength, that is, to become self-supporting.

(4) After removing the green core from the mold or pattern allow it to air dry at room temperature, or heat cure to obtain a hard, solid, cured core.

In addition to use as a polyol source for urethane foams, or as a polyurethane coating, or as a core binder in a foundry process, the polyurethane resins of the invention have utility in a number of other areas. For example, they may be utilized as elastomers, surfactants, adhesives, sealants, plasticizers, paper additives, etc.

The following examples illustrate preparation of alkoxylated starch hydrolysates useful in the invention, formation of useful urethane foams from these alkoxylated products and a polyisocyanate, and use of the polyurethane resins as core binders in a foundry process. All percentages are in terms of percent by weight unless otherwise indicated. It is understood, of course, that these

EXAMPLE I

Preparation of propoxylated dextrose

A 2-liter autoclave was charged with 180 grams (1 mole) of dextrose, 500 grams of propylene oxide (excess) and 2.0 grams of potassium hydroxide in 2–3 ml. of water. The reaction was maintained at 230–290° F. for seven hours at a pressure of 75–115 p.s.i.g. The product was neutralized with tartaric acid, filtered and stripped at 175° F., under a 28 inch vacuum. The polyether was quite fluid and had a hydroxyl number of 509.

EXAMPLE II

Preparation of propoxylated maltose

This product was prepared essentially as described above by reacting 180 grams of maltose with 600 grams of propylene oxide, (excess) and utilizing 3 grams of potassium hydroxide as catalyst contained in 6 ml. of water.

EXAMPLE III

Preparation of polyether of high maltose syrup

This reaction was also run essentially as described in Example I. Specifically, one part of a high maltose syrup (80% dry substance; D.E.—42; maltose—51.9%) was reacted with 0.59 part of propylene oxide for 2–3 hours. The reaction was run in presence of 0.02 part of potassium hydroxide pellets and the reaction conditions were 220°–240° F. at a pressure of 60–70 p.s.i. The polyether was then stripped under vacuum at 300° F. to remove volatiles, and filtered. Thereafter an additional 1.51 parts of propylene oxide (excess) and 0.006 part of potassium hydroxide pellets were added. The propylene oxide was added on demand while all the potassium hydroxide was added at one time in the second stage of reaction. During the second stage the temperature was maintained at 275–285° F. and a pressure was maintained at 60–70 p.s.i. Vacuum was again applied to strip off volatiles. The polyether was then neutralized with 0.029 part of tartaric acid and heated under reduced pressure at 300° F. to remove last traces of water. The final product was again filtered through a coarse filter. The product had a hydroxy number of 450.

EXAMPLE IV

Preparation of polyether from greens

This particular polyether was prepared exactly as described in Example III with the exception that greens from dextrose crystallization (78% dry solids D.E.—76; dextrose—63%) was utilized as the basic starting material. Initially 0.61 part of propylene oxide was added and an addition of 1.52 parts was added thereafter in the second step. The final product had a hydroxyl number of 398.

EXAMPLE V

Preparation of phosphorylated polyether of high maltose syrup in absence of solvent A high maltose syrup polyether was prepared essentially according to the directions of Example III. The polyether had a hydroxy number of 430. To the polyether was then added a commercial source of a polyphosphoric acid (115%) based on the weight of the polyether (1:1 weight ratio). The reaction was run in the absence of a solvent. The reaction was exothermic and the polyphosphoric acid was therefore added with cooling over a period of about 12 hours to prevent overheating. The product was then neutralized with propylene oxide added over a period of 10 hours, and stripped under vacuum during which time aminoethanol was added as a stabilizer.

The final phosphorylated product had a hydroxyl number of 278 and a phosphorus content of 6.04% P.

EXAMPLE VI

Preparation of phosphorylated polyether from high maltose syrup in presence of solvent A high maltose polyether was prepared according to the directions of Example III. 500 gm. of the polyether was dissolved in 770 ml. of xylene to which was added 115% polyphosphoric acid (250 gm.). The addition took place over a total period of 4¼ hours. The mixture was then neutralized by the addition of propylene oxide while cooling over a period of 20 hours. The product was then stripped to remove the solvent and other volatiles and stabilized by the addition of 0.2% by weight of aminoethanol based on the total weight of the reaction mass.

The phosphorylated product had a hydroxy number of 335 and a phosphorus content of 6.1% P.

EXAMPLE VII

Preparation of phosphorylated polyether from greens

A polyether from greens was prepared according to Example VI and phosphorylated according to the directions set out in Example V. The final phosphorylated polyether greens had a hydroxy number of 325 and a phosphorus content of 6.0% P. The original greens polyether before phosphorylation had a hydroxy number of 398.

EXAMPLE VIII

Preparation of polyurethane foam from dextrose polyether

A urethane foam from a dextrose polyether was made by combining the following ingredients:

| | G. |
|---|---|
| Polyether | 100 |
| Silicone | 2 |
| Tetramethyl-1,3-butanediamine (TMBDA) | 0.7 |
| Dibutyl tin dilaurate catalyst | 0.2 |
| Fluorocarbon | 27 |
| Polymethylene polyphenyl isocyanate (PAPI) | 129 |

The above ingredients were mixed for 15 seconds. The cream time was 30 seconds, the rise 68 seconds and the foam tack free in 70 seconds. The foam was cured in an oven at 210° F. for 30 minutes and had a cut density of 2.5 pounds per cubic foot.

The resultant foam had good compression strength, excellent cell structure, and good dimensional stability.

EXAMPLE IX

Preparation of polyurethane foam from maltose polyether

A maltose polyether was prepared in a manner similar to that described in Example II with the exception that the final product had a hydroxyl number of 812.

The above polyether was then formulated with the following ingredients:

| | G. |
|---|---|
| Polyether | 50 |
| PAPI | 103 |
| TMBD | 0.5 |
| Dibutyl tin dilaurate | 0.15 |
| Silicone | 1.0 |
| Fluorocarbon | 20 |

The foam was cured as described above and had the following physical properties:

Table I.—Physical properties

| | |
|---|---|
| Density, pounds per cubic foot | 2.1 |
| Compression strength, p.s.i.: | |
|     Parallel to rise | 45 |
| Dimensional stability—4° F., ambient humidity: | |
|     1 day; percent change volume | 0 |
|     2 days; percent change volume | 0 |
|     5 days; percent change volume | 0 |

185° F., 95% relative humidity:

| | G. |
|---|---|
| 1 day; percent change volume | 8.4 |
| 2 days; percent change in volume | 8.8 |
| 5 days; percent change in volume | 11.9 |

EXAMPLE X

Preparation of polyurethane foam from polyether of high maltose syrup

A high maltose syrup polyether was formed in essentially the manner set out in Example III with the exception that the hydroxyl number was 511.

The polyether was then formulated with the other ingredients necessary to make a foam in the following proportions:

| | G. |
|---|---|
| Polyether | 100 |
| PAPI | 129 |
| TMBD | 0.7 |
| Dibutyl tin dilaurate | 0.2 |
| Silicone emulsifier | 2.0 |
| Fluorocarbon | 25 |

The foam had excellent properties as set out below:

Table II.—Physical properties

| | |
|---|---|
| Density, pounds per cubic foot | 2.4 |
| Compression Strength, p.s.i.: | |
| Parallel to rise | 50 |
| Dimensional Stability—4° F., ambient humidity: | |
| 1 day; percent change volume | 0 |
| 2 days; percent change volume | 0 |
| 5 days; percent change volume | 0 |
| 185° F., 95% relative humidity: | |
| 1 day; percent change volume | 9.2 |
| 2 days; percent change volume | 11.0 |
| 5 days; percent change volume | 13.4 |

EXAMPLE XI

Preparation of polyurethane foam from phosphorylated polyether of high maltose syrup 100 grams of the phosphorylated high maltose polyether syrup was reacted with 70.3 grams of PAPI. The foam had a density of 2.15 pounds per cubic foot, a compression strength (parallel to rise) of 36 p.s.i. and was self-extinguishing.

EXAMPLE XII

Preparation of polyurethane foam from phosphorylated high maltose syrup polyether 84.7 grams of the phosphorylated polyether of Example VI was reacted with 100 grams of PAPI. The resultant foam had a density of 2.15 pounds per cubic foot and was a flame retardant of the nonburning class. The extent of burning was ⅞ inch when subjected to the standard flame retardance test designed ASTM D-1692-59T. The foam had a compression strength (parallel to rise) of 35 p.s.i.

EXAMPLE XIII

Prepaartion of polyurethane foam from phosphorylated greens polyether

Here 100 grams of the phosphorylated greens polyether of Example VII was reacted with 82.3 of PAPI. The resultant foam had a density of 2.0 pounds per cubic foot, a compression strength (parallel to rise) of 35 p.s.i. and was of the self-extinguishing class.

EXAMPLE XIV

Preparation of polyurethane foams from dextrose polyether and additional polyol source 100 grams of the propoxylated dextrose of Example I was reacted with 121 grams of a polyisocyanate. In addition, another polyol source was utilized, namely starch in an amount of 10 grams. 2 grams of silicone, 0.7 gram of TMBD catalyst and 0.2 gram of dibutyl tin dilaurate catalyst were also employed. The blowing agent was a fluorocarbon utilized in an amount of 20 grams.

The resultant polyurethane foam was of excellent quality, had a density of 3.19 pounds per cubic foot, and a compression strength (parallel to rise) of 52 p.s.i.

EXAMPLE XV

A dextrose polyether was prepared which had a hydroxy number of 546. To 100 grams of this was added 2 grams of silicone, 0.7 gram TMBD catalyst, 100 grams of a conventional epoxy resin and 0.2 gram of dibutyl tin dilaurate catalyst. An additional polyol source was also used here, namely, 10 grams of dextrose. The polyether and dextrose were reacted with 137 grams of polyisocyanate and foam prepared by utilization of 20 grams of hydrocarbon blowing agent. The foam had an excellent appearance, a density of 3.45 pounds per cubic foot and a compression strength (parallel to rise) of 59.

EXAMPLE XVI

Preparation of sand core using polyurethane from maltose polyether

In this example a polyurethane resin of the invention was utilized as a sand binder in a foundry molding process. Specifically, 2.2 grams of the maltose polyether of Example VI, 2.8 grams of PAPI, 0.18 gram of silicone emulsifier and about 95 grams of sand were hand mixed. The remaining portion of the sand, 5 grams, was mixed with 0.009 gram of TMBD and 0.015 gram of dibutyl tin dilaurate. The two portions were then blended, poured into a mold at room temperature and packed by ramming. Two samples were then oven cured for 30 minutes at 425° F. in a forced air oven.

Both cores made as outlined above had good green strength and as shown below had excellent physical properties.

TABLE III

| Core No. | Percent weight of sand | | | Core weight (g.) | Tensile, p.s.i. | Scratch test (100 max.) | Cure |
|---|---|---|---|---|---|---|---|
| | Polyether | PAPI | Organic reagents | | | | |
| 1 | 2.2 | 2.8 | 5.0 | 89 | 620+ | 99 | Oven bake. |
| 2 | 2.2 | 2.8 | 5.0 | 87 | 620+ | 99 | Do. |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claimes.

The invention is hereby claimed as follows:

1. A polyurethane resin which is prepared from a reaction mixture comprising:
    (A) an organic polyisocyanate, and
    (B) an alkoxylated starch hydrolysate prepared by alkoxylating a starch hydrolysate in an alkaline environment.

2. The polyurethane resin of claim 1 wherein the starch hydrolysate contains from about 20% to about 85% of polysaccharides.

3. The polyurethane resin of claim 1 wherein the relative proportions of (A) and (B) are 1–3 parts of organic polyisocyanate and 1–3 parts of alkoxylated starch hydrolysate.

4. The polyurethane resin of claim 1 wherein the starch hydrolysate contains from about 30 to about 80% of maltose.

5. The polyurethane resin of claim 1 wherein the alkoxylated starch hydrolysate is a propoxylated starch hydrolysate.

6. A process for producing a polyurethane resin which comprises reacting the mixture of claim 5 and curing said product.

7. A process for producing a polyurethane resin foam which comprises reacting in presence of a foaming agent the mixture of claim 5, and curing said product.

8. The polyurethane resin of claim 1 wherein the starch hydrolysate comprises greens derived from the crystallization of dextrose.

9. The polyurethane resin of claim 1 wherein the starch hydrolysate comprises dextrose.

10. The polyurethane resin of claim 1 wherein the starch hydrolysate is a corn starch hydrolysate.

11. The polyurethane resin of claim 1 wherein the starch hydrolysate has a D.E. of from about 35 to about 60.

12. A process for producing a polyurethane resin which comprises reacting the mixture of claim 1 and curing said product.

13. A process for producing a polyurethane resin foam which comprises reacting in presence of a foaming agent the mixture of claim 1, and curing said product.

14. A polyurethane resin which is prepared from a reaction mixture comprising:

(A) 1–3 parts of an organic polyisocyanate, and
(B) 1–3 parts of an alkoxylated starch hydrolysate, prepared by alkoxylating a starch hydrolysate in an alkaline environment, said starch hydrolysate containing from about 30% to about 80% of maltose.

15. The polyurethane resin of claim 14 wherein the starch hydrolysate comprises greens derived from the crystallization of dextrose.

16. The polyurethane resin of claim 14 wherein the alkoxylated starch hydrolysate is a propoxylated starch hydrolysate.

17. The polyurethane resin of claim 14 wherein the alkoxylated starch hydrolysate is a propoxylated corn starch hydrolysate.

18. The polyurethane resin of claim 14 which is in cellular form.

19. The polyurethane resin of claim 14 which is in the form of a thin coating.

20. A process for producing a polyurethane resin which comprises reacting the mixture of claim 14 and curing said product.

21. A process for producing a polyurethane resin foam which comprises reacting in presence of a foaming agent the mixture of claim 14, and curing said product.

No references cited.

DONALD E. CZAJA, Primary Examiner

M. J. WELSH, Assistant Examiner

U.S. Cl. X.R.

106—162; 260—9R, 37N, 75NP, 77.5AS